(12) United States Patent
Beg et al.

(10) Patent No.: US 7,944,182 B2
(45) Date of Patent: May 17, 2011

(54) ADJUSTABLE BATTERY CHARGER FOR UPS

(75) Inventors: Mirza Akmal Beg, Pepperell, MA (US); Luka Petrovic, Billerica, MA (US); Francis Masciarelli, Milford, MA (US)

(73) Assignee: American Power Conversion Corporation, West Kingston, RI (US)

( * ) Notice: Subject to any disclaimer, the term of this patent is extended or adjusted under 35 U.S.C. 154(b) by 701 days.

(21) Appl. No.: 11/833,600

(22) Filed: Aug. 3, 2007

(65) Prior Publication Data

US 2009/0033283 A1    Feb. 5, 2009

(51) Int. Cl.
*H02J 7/04* (2006.01)
*H02J 7/06* (2006.01)
*G01R 19/00* (2006.01)

(52) U.S. Cl. ........ 320/162; 320/157; 320/158; 320/163; 307/64; 307/66; 702/64

(58) Field of Classification Search .................. 320/157, 320/158, 162–164; 307/64, 66; 702/64
See application file for complete search history.

(56) References Cited

U.S. PATENT DOCUMENTS

| | | |
|---|---|---|
| 3,940,679 A | 2/1976 | Brandwein et al. |
| 4,139,846 A | 2/1979 | Conforti |
| 4,217,645 A | 8/1980 | Barry et al. |
| 4,303,877 A | 12/1981 | Meinhold |
| 4,331,911 A | 5/1982 | Park |
| 4,346,151 A | 8/1982 | Uba et al. |
| 4,394,741 A | 7/1983 | Lowndes |
| 4,684,872 A | 8/1987 | Stewart |
| 4,707,795 A | 11/1987 | Alber et al. |
| 4,709,202 A | 11/1987 | Koenck et al. |
| 4,746,854 A | 5/1988 | Baker et al. |
| 4,820,966 A | 4/1989 | Fridman |
| 4,843,299 A | 6/1989 | Hutchings |
| 4,885,523 A | 12/1989 | Koenck |
| 4,918,368 A | 4/1990 | Baker et al. |
| 4,947,123 A | 8/1990 | Minezawa |
| 4,949,046 A | 8/1990 | Seyfang |
| 4,961,043 A | 10/1990 | Koenck |
| 4,965,738 A | 10/1990 | Bauer et al. |
| 5,027,294 A | 6/1991 | Fakruddin et al. |
| 5,043,651 A | 8/1991 | Tamura |
| 5,047,961 A | 9/1991 | Simonsen |
| 5,049,804 A | 9/1991 | Hutchings |
| 5,057,383 A | 10/1991 | Sokira |
| 5,130,659 A | 7/1992 | Sloan |
| 5,136,231 A | 8/1992 | Faulk |
| 5,148,043 A | 9/1992 | Hirata et al. |
| 5,151,644 A | 9/1992 | Pearson et al. |
| 5,153,496 A | 10/1992 | LaForge |
| 5,159,272 A | 10/1992 | Rao et al. |
| 5,200,689 A | 4/1993 | Interiano et al. |
| 5,206,578 A | 4/1993 | Nor |
| 5,218,288 A | 6/1993 | Mickal et al. |

(Continued)

*Primary Examiner* — Richard V Muralidar
(74) *Attorney, Agent, or Firm* — Lando & Anastasi, LLP (57) ABSTRACT

An uninterruptible power supply (UPS) having an adjustable battery charger that generates a charger current, and a controller, coupled to the adjustable battery charger, that receives a signal representative of a system constraint and provides a reference, based on the signal, to the adjustable battery charger to control an amplitude of the charger current supplied by the adjustable battery charger based on the system constraint. The system constraint may include, for example, a maximum input current to the UPS, maximum charging current of the battery cell, and maximum and/or minimum charger current values.

11 Claims, 4 Drawing Sheets

U.S. PATENT DOCUMENTS

| | | | |
|---|---|---|---|
| 5,254,928 A | 10/1993 | Young et al. | |
| 5,266,880 A | 11/1993 | Newland | |
| 5,278,487 A | 1/1994 | Koenck | |
| 5,281,955 A | 1/1994 | Reich et al. | |
| 5,283,512 A | 2/1994 | Stadnick et al. | |
| 5,302,858 A | 4/1994 | Folts | |
| 5,315,228 A | 5/1994 | Hess et al. | |
| 5,321,626 A | 6/1994 | Palladino | |
| 5,321,627 A | 6/1994 | Reher | |
| 5,325,041 A | 6/1994 | Briggs | |
| 5,345,163 A | 9/1994 | Gibbons et al. | |
| 5,349,282 A | 9/1994 | McClure | |
| 5,349,535 A | 9/1994 | Gupta | |
| 5,381,350 A | 1/1995 | Fiorina et al. | |
| 5,382,893 A | 1/1995 | Dehnel | |
| 5,422,558 A | 6/1995 | Stewart | |
| 5,455,499 A | 10/1995 | Uskali et al. | |
| 5,459,671 A | 10/1995 | Duley | |
| 5,462,439 A | 10/1995 | Keith | |
| 5,498,950 A | 3/1996 | Ouwerkerk | |
| 5,504,415 A | 4/1996 | Podrazhansky et al. | |
| 5,510,690 A | 4/1996 | Tanaka et al. | |
| 5,543,667 A | 8/1996 | Shavit et al. | |
| 5,666,040 A | 9/1997 | Bourbeau | |
| 5,686,768 A | 11/1997 | Thomsen et al. | |
| 5,739,667 A * | 4/1998 | Matsuda et al. | 320/128 |
| 5,818,201 A | 10/1998 | Stockstad et al. | |
| 5,883,497 A | 3/1999 | Turnbull | |
| 5,920,181 A | 7/1999 | Alberkrack et al. | |
| 5,965,996 A | 10/1999 | Arledge et al. | |
| 5,969,436 A | 10/1999 | Chalasani et al. | |
| 6,002,237 A | 12/1999 | Gaza | |
| 6,031,354 A | 2/2000 | Wiley et al. | |
| 6,081,104 A | 6/2000 | Kern | |
| 6,169,669 B1 * | 1/2001 | Choudhury | 363/37 |
| 6,184,655 B1 | 2/2001 | Malackowski | |
| 6,268,711 B1 | 7/2001 | Bearfield | |
| 6,274,950 B1 | 8/2001 | Gottlieb | |
| 6,329,792 B1 | 12/2001 | Dunn et al. | |
| 6,373,225 B1 | 4/2002 | Haraguchi et al. | |
| 6,424,119 B1 | 7/2002 | Nelson et al. | |
| 6,469,471 B1 | 10/2002 | Anbuky et al. | |
| 6,522,101 B2 | 2/2003 | Malackowski | |
| 6,549,014 B1 | 4/2003 | Kutkut et al. | |
| 6,584,329 B1 | 6/2003 | Wendelrup et al. | |
| 6,700,351 B2 | 3/2004 | Blair et al. | |
| 6,803,678 B2 | 10/2004 | Gottlieb et al. | |
| 6,812,670 B2 | 11/2004 | Minamiura et al. | |
| 6,864,666 B2 | 3/2005 | Breen et al. | |
| 6,885,168 B2 | 4/2005 | Okumura et al. | |
| 6,888,468 B2 | 5/2005 | Bertness | |
| 6,928,568 B2 | 8/2005 | Breen et al. | |
| 6,983,212 B2 | 1/2006 | Burns | |
| 6,992,464 B2 | 1/2006 | Takano et al. | |
| 7,045,989 B2 | 5/2006 | Sakakibara et al. | |
| 7,057,308 B2 | 6/2006 | Stranberg et al. | |
| 7,132,833 B2 | 11/2006 | Layden et al. | |
| 7,196,494 B2 | 3/2007 | Baumgartner | |
| 7,199,489 B2 | 4/2007 | Gottlieb et al. | |
| 7,202,576 B1 | 4/2007 | Dechene et al. | |
| 7,400,113 B2 | 7/2008 | Osborne | |
| 7,612,472 B2 | 11/2009 | Mutabdzija et al. | |
| 2001/0009361 A1 | 7/2001 | Downs et al. | |
| 2001/0012579 A1 | 8/2001 | Vackar | |
| 2001/0033502 A1 | 10/2001 | Blair et al. | |
| 2002/0024332 A1 | 2/2002 | Gardner | |
| 2002/0136042 A1 | 9/2002 | Layden et al. | |
| 2002/0194517 A1 | 12/2002 | Cohen et al. | |
| 2002/0195997 A1 | 12/2002 | Peek et al. | |
| 2003/0005339 A1 | 1/2003 | Cohen et al. | |
| 2003/0048006 A1 | 3/2003 | Shelter et al. | |
| 2003/0052644 A1 | 3/2003 | Nelson et al. | |
| 2004/0075343 A1 | 4/2004 | Wareham et al. | |
| 2004/0104706 A1 | 6/2004 | Ooi et al. | |
| 2004/0160210 A1 | 8/2004 | Bohne et al. | |
| 2004/0189248 A1 | 9/2004 | Boskovitch et al. | |
| 2004/0231875 A1 | 11/2004 | Rasmussen et al. | |
| 2004/0263123 A1 | 12/2004 | Breen et al. | |
| 2005/0001589 A1 | 1/2005 | Edington et al. | |
| 2005/0024016 A1 | 2/2005 | Breen et al. | |
| 2005/0162019 A1 | 7/2005 | Masciarelli et al. | |
| 2005/0162129 A1 | 7/2005 | Mutabdzija et al. | |
| 2005/0278075 A1 | 12/2005 | Rasmussen et al. | |
| 2006/0012341 A1 | 1/2006 | Burns | |
| 2006/0044846 A1 | 3/2006 | Hjort et al. | |
| 2006/0072262 A1 | 4/2006 | Paik et al. | |
| 2006/0192436 A1 | 8/2006 | Stranberg et al. | |

\* cited by examiner

ADJUSTABLE BATTERY CHARGER FOR UPS

BACKGROUND

1. Field of Invention

Embodiments relate generally to apparatuses and methods for charging the batteries of a UPS. Specifically, at least one embodiment relates to charging UPS batteries in circumstances where the UPS has been supplied with additional external batteries to increase run time.

2. Discussion of Related Art

Uninterruptible power supplies ("UPS") are used in a variety of applications to provide power to electrical loads, for example, loads that are intended to operate during interruptions in a primary source of electrical power. In general, a UPS includes, or is connected to, both a primary source of power and an alternate source of power where the alternate source of power can be employed to supply power to the electrical load when the primary source is not available. Often, the primary source of power is an AC power source such as power supplied from an electric utility. The alternate source of power generally includes one or more batteries supplying DC power.

The batteries are generally recharged after use by a battery charger coupled to the UPS. The standard battery capacity supplied with a UPS is generally selected to provide about 4 to 5 minutes of run time at the rated output power. However, in some instances a user may add extra batteries to extend the run time (i.e., the time for which the UPS is able to supply back up power to the load). The maximum charger rating for a UPS is typically about 10% of the rated output power. This charger rating is usually adequate to recharge the standard battery capacity supplied with the UPS in about 2-3 hours. However, this recharge time may become greatly extended if the user has added extra batteries. Depending on the extra battery capacity, the charging time, because of limited charger power, may become unacceptably long.

A common solution to this problem is to add an external battery charger to supplement the UPS internal battery charger and reduce the recharge time. The external charger is installed across the batteries. An important issue that must be addressed with this approach is matching of the performance characteristics of the UPS internal charger and the external charger. Furthermore, with the addition of the external charger, the UPS may lose its ability to detect faults and/or abnormalities with the battery system and may lose accuracy with respect to predicting run time.

SUMMARY OF INVENTION

Aspects and embodiments are directed to methods and apparatuses to optimize battery charger power and thereby optimize battery charging time. In particular, methods and apparatuses may be used to charge batteries coupled to an uninterruptible power supply (UPS) and may dynamically adjust to varying system conditions, such as the number of batteries connected at any given time as well as variations in output load and input voltage, as discussed below. According to at least one embodiment, a battery charger may have a variable power rating and may automatically operate at an optimal power level based on system constraints such as maximum allowable input current, maximum allowable battery charging current, or other criteria.

According to one embodiment, a method of optimizing battery charger power in a UPS may comprise generating a charger current, supplying the charger current to a battery array coupled to the UPS, monitoring an input current to the UPS, and if an amplitude of the input current exceeds a first predetermined limit, reducing the charger current. In one example, monitoring the input current may include comparing the input current with a signal representative of the first predetermined limit.

In one example, the method may further comprise comparing an amplitude of the reduced charger current with a predetermined minimum charger current value, and if the amplitude of the charger current is below the predetermined minimum charger current value, increasing the charger current to the predetermined minimum charger current value. According to some examples, the method may further comprise increasing the charger current if the amplitude of the input current drops below a second predetermined limit. In these examples, the method may also further comprise comparing an amplitude of the increased charger current with a predetermined maximum charger current value, and if the amplitude of the charger current is greater than the predetermined maximum charger current value, decreasing the charger current to the predetermined maximum charger current value. In addition, the method may include receiving a signal representative of the predetermined maximum charger current value. Increasing the charger current may include increasing the charger current by a predetermined increment, and repeating the acts of comparing the amplitude of the input current with the signal representative of the first predetermined limit and increasing the charger current by the predetermined increment until the amplitude of the input current reaches the first predetermined limit. Furthermore, decreasing the charger current may include decreasing the charger current by a predetermined increment, and repeating the acts of comparing the amplitude of the input current with the signal representative of the first predetermined limit and decreasing the charger current by the predetermined increment, until the amplitude of the input current falls below the first predetermined limit.

Methods including any or all of the above-discussed acts may be implemented in software or encoded into hardware devices such as programmable gate array logic. For example, a UPS may have a controller programmed with instructions that, as a result of being executed by a processor, instruct the controller and the UPS to perform an embodiment of the method(s).

According to another embodiment, an uninterruptible power supply may comprise an input module configured to receive input power, at least one battery, an output module configured to provide output power derived from at least one of the input power and battery power, and adjustable battery charger that generates a charger current, and a controller, coupled to the adjustable battery charger, that receives a signal representative of a system constraint and provides a reference, based on the signal, to the adjustable battery charger to control an amplitude of the charger current based on the system constraint. The system constraint may include, for example, a maximum input current value, maximum charging current of any battery cell, and maximum and/or minimum charger current values.

In one example, uninterruptible power supply may further comprise a comparator, coupled to the controller, that receives the signal and an input current to the uninterruptible power supply, compares amplitude of the input current with a maximum amplitude specified by the signal, and produces an error signal based on the comparison. The controller may be configured to adjust the reference based on the error signal. In another example, the uninterruptible power supply may further comprise a current limiter coupled to the controller, wherein the current limited is configured to receive the reference and to adjust the reference to limit the charger current to within a predetermined range of amplitudes. In another example, the controller may be configured to compare an amplitude of the charger current to the maximum charger current value and to adjust the reference to maintain the charger current amplitude below the maximum charger current value. In another example, the controller may be configured to compare an amplitude of the maximum charging current of any battery cell in the battery array (Max_I_batt) to the maximum manufacturer battery cell current (I_batt_limit), and to adjust the charger current reference to maintain the individual battery cell current below the suggested maximum manufacturer battery cell current.

According to another embodiment, an uninterruptible power supply may comprise an input module configured to receive input power, a battery array including at least one battery, an output module configured to provide output power derived from at least one of the input power and battery power, a battery charger configured to generate a charger current to charger the battery array, and a controller coupled to the battery array and to the battery charger, the controller being configured to receive a signal representative of a system constraint and to provide a reference, based on the signal, to the battery charger to control an amplitude of the charger current based on the system constraint. In one example, the system constraint may include a maximum input current and a maximum charger current. The controller may be configured to monitor an input current and the charger current and to dynamically adjust the charger current to maintain the charger current substantially at the maximum charger current without allowing the input current to exceed the maximum input current.

Still other aspects, embodiments, and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. The accompanying drawings are included to provide illustration and a further understanding of the various aspects and embodiments, and are incorporated in and constitute a part of this specification. The drawings, together with the remainder of the specification, serve to explain principles and operations of the described and claimed aspects and embodiments.

BRIEF DESCRIPTION OF THE DRAWINGS

Various aspects of at least one embodiment are discussed below with reference to the accompanying figures. In the figures, which are not intended to be drawn to scale, each identical or nearly identical component that is illustrated in various figures is represented by a like numeral. For purposes of clarity, not every component may be labeled in every drawing. The figures are provided for the purposes of illustration and explanation and are not intended as a definition of the limits of the invention. In the figures.

DETAILED DESCRIPTION

Aspects and embodiments are directed to methods and apparatuses to reduce battery recharge time in an uninterruptible power supply (UPS) having additional external battery capacity for increased back-up time. More particularly, methods and apparatuses are provided to optimize battery charger power under variable conditions, while ensuring that system constraints, such as maximum input and/or maximum battery cell charging currents, are not violated, as discussed below.

It is to be appreciated that embodiments of the methods and apparatuses discussed herein are not limited in application to the details of construction and the arrangement of components set forth in the following description or illustrated in the accompanying drawings. The methods and apparatus are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiments. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items.

Figure 1:
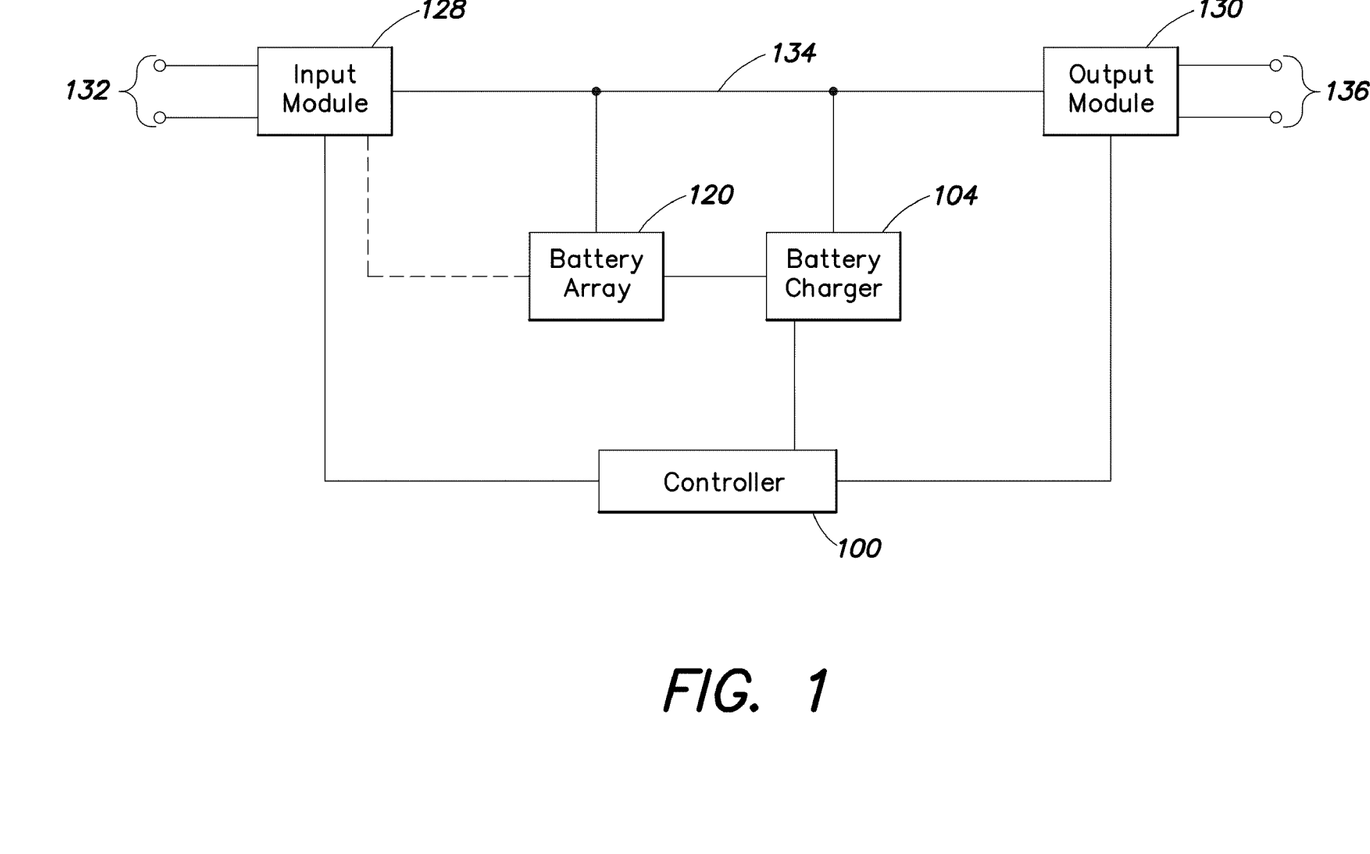
FIG. 1 is a block diagram of one example of an uninterruptible power supply.

Referring to FIG. 1, there is illustrated a block diagram of one example of a UPS including a battery array 120, a controller 100 and a battery charger 104. The UPS also includes an input module 128 that generally includes an AC to DC converter, and an output module 130 that generally includes a DC to AC converter. In one example, the UPS may receive an AC signal (e.g., from the mains) at the input feed 132 and the input module 128 may convert the AC signal to a DC signal provided on line 134. The output module 130 may convert this DC signal back to an AC signal to be supplied at an output feed 136. In the event of loss of power at the input feed 132, the battery array may provide or supplement the DC signal on line 134. Depending on the compatibility of the battery array voltage and the input voltage requirements of output module (line 134), the battery array may be directly connected to line 134 or the battery array voltage can be adjusted through the input module 128 after the loss of power at the input feed 132. The length of time for which the battery array can supply the DC signal is referred to as the "run time" of the UPS. The battery charger 104 is used to recharge the battery array 120 and may be controlled by the controller 100, as discussed further below.

Figure 2:
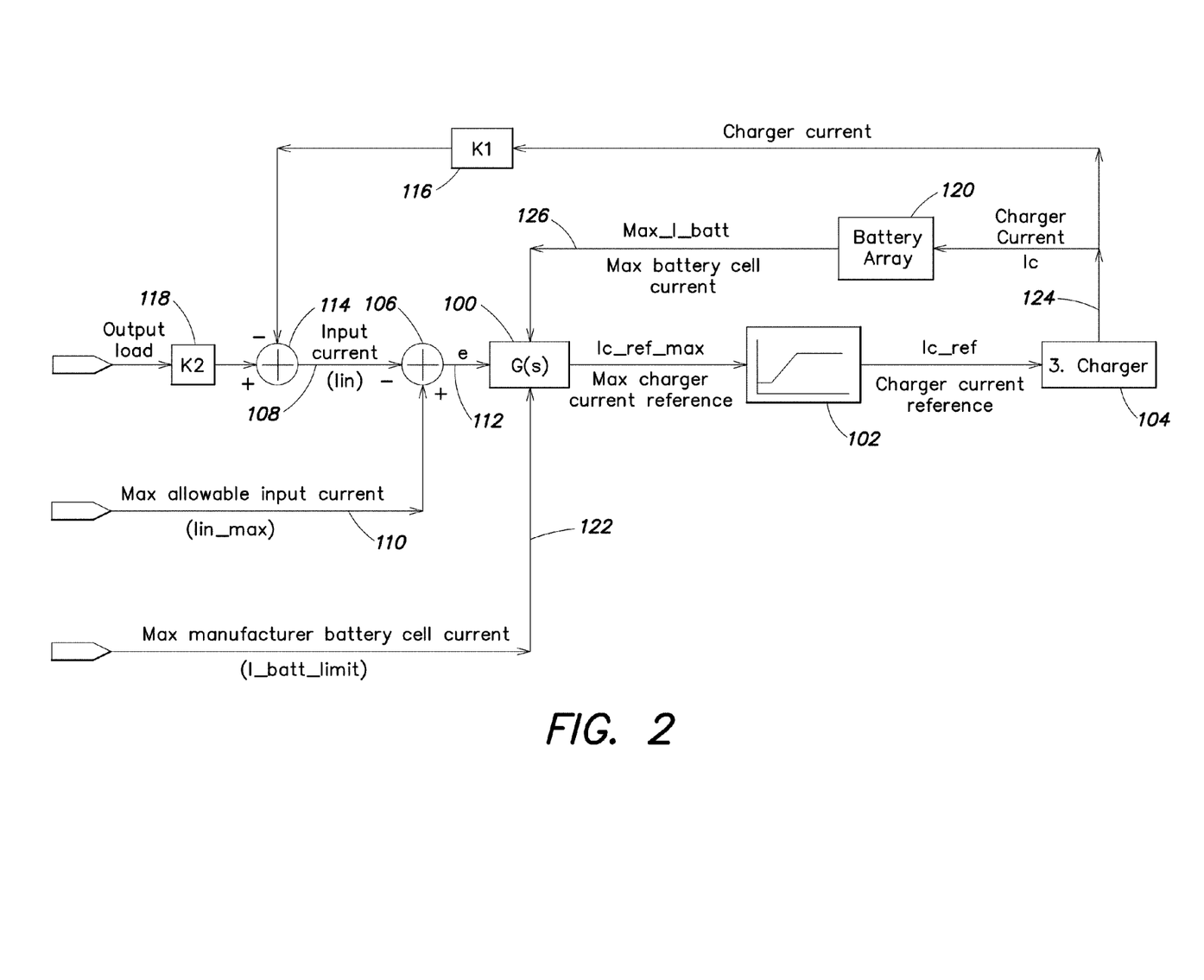
FIG. 2 is a block diagram of one example of a charging system according to aspects of the invention.

Referring to FIG. 2, there is illustrated a functional block diagram of one example of a battery charger system according to embodiments of the invention. The charger system may comprise a controller 100, a current limiter 102 and a charger 104. The charger 104 produces a charger current that is used to charge the battery array 120 connected to the UPS. The battery array 120 may include the UPS internal batteries as well as any external or additional batteries coupled to the UPS. The charger current is determined by the controller 100 together with the current limiter 102, as discussed further below. According to at least some aspects, the charger system may operate to dynamically maximize battery charger power, adjusting to changing system conditions, and thereby reduce battery charging time, without violating any of the system constraints. In at least some embodiments, these system constraints may include the following: A maximum allowable input current, a maximum allowable charging current for each battery, and a maximum charger current that the charger system electronics can handle. The maximum allowable charging current for each battery may typically be defined by the battery manufacturer's specifications. Similarly, the maximum charger current that the charger system can handle may be defined by the charger system specifications.

The input current to the UPS system may be received from the mains or from another power source, such as a bypass circuit. The input current generally increases with increasing output load and charger power, and with decreasing input voltage. This dependence of input current on output load and charger power is shown schematically in FIG. 1 as an adder 114 and two functions K1, K2. Block 116 illustrates that the input current is dependent on the charger current in a relationship defined by function K1 (this function may be linear, non-linear, etc.). Block 118 illustrates that the input current is also dependent on the output load in a relationship defined by function K2 (again, this function may be linear, non-linear, etc.). In addition, blocks 116 and 118 (i.e., functions K1 and K2) also illustrate a variable amplitude or "gain" of each contribution. In other words, the effect of the output load and the charger current on the input current need not be the same or even similar. The input current may be affected far more greatly by changes in the output load, for example, than by changes in the charger current, or vice versa. This variable effect is schematically accounted for by the functions K1 and K2. The adder 114 schematically illustrates these that dependencies are combined, such that the input current on line 108 is a function of both the output load and the charger current, in combination. The maximum input current may be determined by an input circuit breaker or fuse that protects the input feed of the UPS and circuit electronics. Since the input current is limited by the input feed protection, and the output load is determined external to the charger system, the charger system in at least one embodiment controls the charger power (i.e., charger current) so as not to exceed the maximum input current limitation.

According to one embodiment, the charger system may include a comparator 106 that may be used, together with controller 100, to measure and control the input current. The comparator 106 may measure the input current (Iin) supplied on line 108 and compare the measured current with the input current limit (Iin_max). As discussed above, Iin_max may be based on the input feed protection circuitry (e.g., by a fuse or circuit breaker). A signal representing the input current limit may be supplied on line 110. In one example, this limit may be hard coded in the micro processor (of controller 100) for each UPS model, based on the power ratting and recommended input protection scheme. In another example, the limit may be user supplied depending on users' selected input circuit breaker. Based on this comparison, the comparator 106 may produce an error signal on line 112. This error signal is fed to the controller 100 which may set a maximum allowable charger current reference based on the error signal. This reference is a signal that may be provided to the charger 104 to indicate to the charger 104 the amplitude of the charger current to be produced. Thus, the controller and the comparator may be used to ensure that the charger current is controlled so as not to violate the maximum allowable input current system constraint.

As discussed above, another system constraint may be a maximum allowable charging current for each battery, as determined by the battery manufacturer's specifications. To ensure that these constraints are not violated, the system may use the current limiter 102 to limit the charger current to within the maximum and minimum levels appropriate for the battery array 120. In one embodiment, the maximum and minimum current levels for each battery may be preset based on a minimum used by most batteries of the kind likely to be connected to the UPS. The total maximum limit for the charger current may then be determined based on the number of batteries connected in any particular case and the charger power. In one example, the UPS may be able to communicate with the batteries via a particular communications protocol, and may therefore be able to automatically determine how many batteries are connected and what the charging current of each battery cell is.

Referring to FIG. 2, in this case, a signal may be received by the controller on line 126 from the battery array 120, indicating the number of batteries connected, and the charging current of any battery cell (Max_I_batt). This may be the case, for example, where the UPS and the batteries are provided by the American Power Conversion Corporation (APC). In other examples, a user may manually input the number of batteries to the system, and the controller may use this information to set an upper current limit for the current limiter 102 (Ic_max), as discussed further below. The upper charger current limit may thus be dynamically adjustable based on the number of batteries connected to the UPS at any given time.

Still referring to FIG. 2, according to one embodiment, the current limiter 102 may receive the maximum allowable charger current reference from the controller 100 and compare the reference with the preset upper and lower current limits. If the maximum charger current reference from the controller specifies a charger current that the is greater than the maximum allowable charger current (based on the battery specifications and charger system specifications), the current limiter 102 may reduce the charger current reference to specify a charger current equal to the maximum allowable charger current. Similarly, if the maximum charger current reference from the controller 100 specifies a charger current that is less than the minimum charging current required by the batteries, the current limiter may increase the charger current reference to be equal to the preset lower limit. The limited charger current reference is then supplied from the current limiter 102 to the charger 104 which produces the charger current (Ic) output on line 124 to charge the battery array 120.

Figure 3:
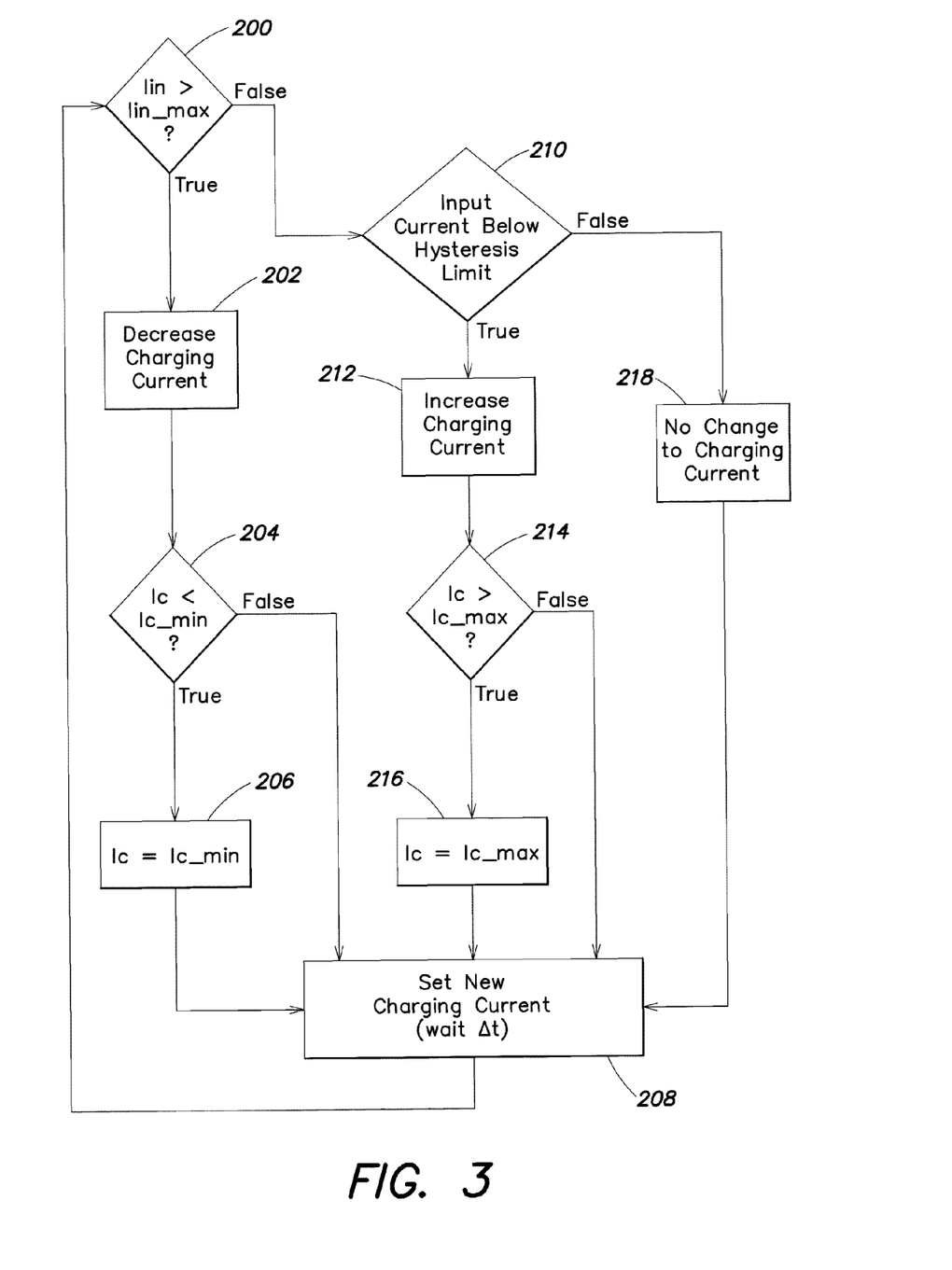
FIG. 3 is a flow diagram illustrating an example control algorithm that may be used by the charging system of FIG. 2.

Referring to FIG. 3, there is illustrated a flow diagram showing one example of a control algorithm that may be implemented by the charger system of FIG. 2 to set the charger current supplied to the battery array. The algorithm may be used to adjust the charger current, Ic, to keep the charger current at a maximum level that does not exceed the maximum allowable charging current set by the battery limits, while also maintaining the input current, Iin, below the maximum limit set by the input feed protection circuitry. For example, if the output load increases, the input current may also increase (as determined by function K2, as discussed above) and may exceed the maximum allowable input current. The system may start to decrease the charger current in order to reduce the input current. This is illustrated in FIG. 3, steps 200 and 202.

As discussed above, the controller 100 may receive from the comparator 106 an error signal based on the comparison of the input current on line 108 with the maximum allowable input current set by the input protection circuitry. In step 200, the system may thus determine whether the input current on line 108 exceeds the maximum allowable input current. If this condition is true (i.e., Iin>Iin_max), then in step 202, the controller may decrease the charger current reference (Ic_ref)

by an amount, delta-Ic_ref (ΔIc_ref). Thus, the new charger current reference is given by Ic_ref_new=Ic_ref−ΔIc_ref. Steps 200 and 202 may be repeated to continue reducing the charger current until the input current no longer exceeds the maximum value (i.e., the condition in step 200 becomes false). Thus, the system may optimize the charger power because the charger current steps ΔIc may be made small enough that the input current may settle just below the maximum limit.

Still referring to FIG. 3, in another example, after reducing the charger current, the system may then determine whether the new charger current reference specifies a charger current Ic that is greater or less than a minimum charging current limit (Ic_min). If the new charger current, Ic_new, is set to be less than the minimum charging current limit (Ic_new<Ic_min), the current limiter 102 (see FIG. 1) may act (in step 206) to set the new charger current reference to the minimum allowable value (Ic_ref_new=Ic_min). The charger 104 receives the new charger current reference from the current limiter 102 and outputs the specified charger current (Ic_new=Ic_min) to the battery array (step 208). In one example, step 204 may occur before steps 200 and 202 are repeated. In this example, once the charger current reaches the minimum level, if the input current still exceeds the maximum allowable input current, other steps may be taken to reduce the input current. In at least one example, the UPS and charger system may be designed in such way that, under most conditions, this will not happen. However, if the UPS is in overload with low input voltage, the input current may be greater than the specified input current limit. Therefore, in at least one example, the UPS and charger system may be designed to support this condition for a specified, usually short, time. For example, the UPS may stop the charger, take input current from the line equal to the input current limit, and take the remainder of the needed power from the battery.

When the output load is reduced, for example, the input current may also decrease, as discussed above. In this case, in step 200 the controller may determine that the input current Iin is less than the maximum limit. According to one embodiment, the controller may then determine whether the input current is below a certain limit, termed the hysteresis limit, such that the charger power should be increased so as to keep the system operating at optimum charger power (step 210). In most cases, the input current will experience some, generally minor, fluctuations. Therefore, a threshold value below which the input current must drop before any action is taken regarding the charger current may be set. This threshold value is termed the hysteresis limit, and its value may be set so as to account for such routine fluctuations in the input current. Thus, the system may act to change the charger current only when a predetermined drop, greater than the levels of normal variations, is observed in the input current. Setting the hysteresis limit may facilitate system stability, preventing the system from making continuous unnecessary adjustments based on only minor variations in input current.

If, in step 210, the controller determines that the input current is within the hysteresis limits, then no change is required in the value of the charger current. Therefore, in step 218, the controller may keep the maximum charger current reference the same as it was before, such that the charger current remains at its previous value (Ic_new=Ic).

If, in step 210, the controller determines that the input current is below the hysteresis limit, this provides an indication that the system is operating at below optimum levels and that the charger current may be increased. Therefore, in step 212 the controller may increase the maximum charger current reference by an amount ΔIc_ref. Thus, the new maximum charger current reference Ic_ref_new=Ic_ref+ΔIc_ref. Increasing the charger current may continue until one of the following conditions is met: the charger current either reaches the maximum level allowable for the battery array or the input current exceeds the lower hysteresis limit. Thus, in one example, steps 210 and 212 may be repeated until the input current exceeds the lower hysteresis limit. Alternatively, after increasing the charger current by the amount ΔIc, in a step 214, the current limiter may compare the new maximum charger current reference Ic_ref_new with the preset limits to determine whether the new, increased charger current reference specifies a charger current that is greater than the maximum allowable charging current for the battery array. If the new maximum charger current reference is such that the charger current would exceed the maximum allowable charging current (Ic>Ibatt_limit), then the current limiter may adjust the charger current reference (step 216) to limit the charger current to the maximum allowable value (Ic_new=Ibatt_limit). This process optimizes charger power by keeping the charger current at a maximum within the input current and battery constraints.

In one embodiment, once the new charger current value has been set and provided to the charger, the system may wait a predetermined time period, Δt, (step 208) before repeating the monitoring and adjustment process to give the charger some time to respond to the new charger current reference. In this embodiment, the system may make adjustments in the charger current at discrete time intervals. In another embodiment, the system may continuously monitor the input current and adjust the charger current as needed, without waiting for any specified time period.

Figure 4:
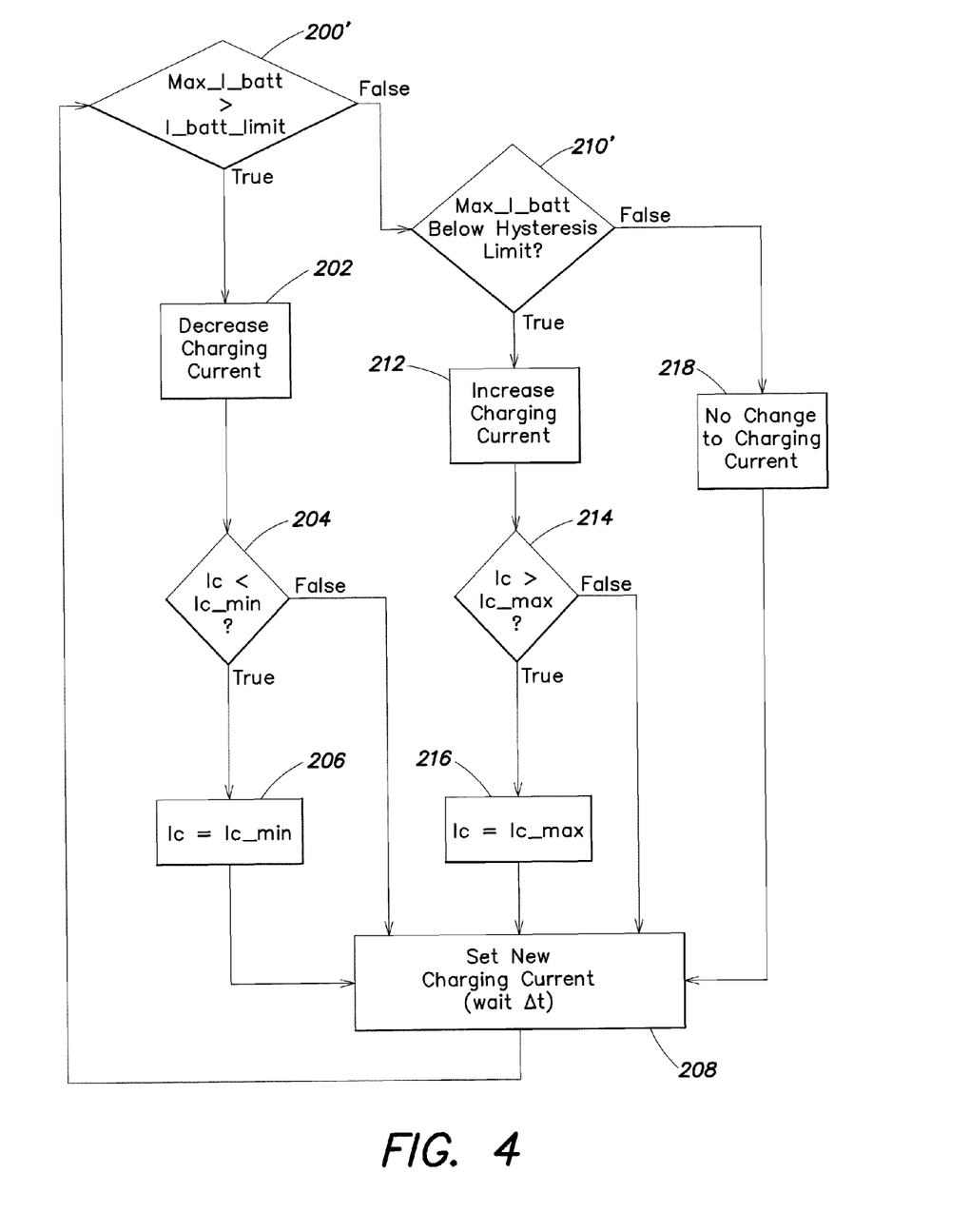
FIG. 4 is the flow diagram of FIG. 3, modified according to an alternative embodiment.

According to another embodiment, rather than comparing the input current against set limits in steps 200 and 210, the charger system may adjust the charger current based on the maximum battery cell current constraint to maintain the individual battery cell current below the suggested maximum manufacturer battery cell current. A flow diagram showing an example of the control algorithm of FIG. 3 for this embodiment is illustrated in FIG. 4. Thus, in step 200', the system may compare the maximum charging current of any battery cell in the battery array (Max_I_batt) to the maximum manufacturer battery cell current (I_batt_limit). If this condition is true, the system may proceed to step 202 and decrease the charger current by an amount ΔIc, as discussed above. If the condition Max_I_batt>I_batt_limit is false, in step 210' the controller may determine whether or not the battery cell current is within preset hysteresis limits (i.e., is Max_I_batt<I_batt_limit−I_batt_hyst), as discussed above with reference to the input current. These hysteresis limits may be selected to prevent oscillations between the two processes of increasing and decreasing the charger current due to normal variations in the battery cell current. Depending on whether the maximum battery cell current is or is not within the hysteresis limits, the system may proceed to step 212 or 218, as discussed above.

In summary, methods and apparatuses discussed herein may provide a solution to the problem of overly long recharge time for UPS systems that include additional external batteries by dynamically optimizing charger power. A charger system according to embodiments of the invention may automatically adjust its power rating based on system conditions and constraints such as maximum allowable input current and maximum allowable charging current for the batteries. Such a charger system may eliminate or reduce the need for and/or power rating of an external battery charger. In addition, the UPS may maintain full control over the battery charging scheme, thereby maintaining its ability to detect and isolate faults and to accurately predict run time.

Having thus described several aspects of at least one embodiment, it is to be appreciated various alterations, modifications, and improvements will readily occur to those skilled in the art. For example, the charger current (and thus charger power) may be adjusted based on inputs other than maximum allowable input current and maximum allowable battery charging current. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A method of optimizing battery charger power in an uninterruptible power supply (UPS), the method comprising:
   generating a charger current;
   supplying the charger current to a battery array coupled to the UPS;
   monitoring an input current to the UPS by comparing the amplitude of the input current with a signal representative of a first predetermined limit;
   if the amplitude of the input current exceeds the first predetermined limit, reducing the charger current; and
   if the amplitude of the input current is less than a second predetermined limit, increasing the charger current;
   wherein increasing the charger current includes:
      increasing the charger current by a predetermined increment; and
      repeating the acts of comparing the amplitude of the input current with the signal representative of the first predetermined limit and increasing the charger current by the predetermined increment until the amplitude of the input current reaches the first predetermined limit.

2. The method as claimed in claim 1, further comprising:
   comparing an amplitude of the increased charger current with a predetermined maximum charger current value; and
   if the amplitude of the charger current is greater than the predetermined maximum charger current value, decreasing the charger current to the predetermined maximum charger current value.

3. A method of optimizing battery charger power in an uninterruptible power supply (UPS), the method comprising:
   generating a charger current;
   supplying the charger current to a battery array coupled to the UPS;
   monitoring an input current to the UPS by comparing the amplitude of the input current with a signal representative of a first predetermined limit; and
   if the amplitude of the input current exceeds the first predetermined limit, reducing the charger current;
   wherein decreasing the charger current includes:
      decreasing the charger current by a predetermined increment; and
      repeating the acts of comparing the amplitude of the input current with the signal representative of the first predetermined limit and decreasing the charger current by the predetermined increment, until the amplitude of the input current falls below the first predetermined limit.

4. The method as claimed in claim 3, further comprising:
   comparing an amplitude of the reduced charger current with a predetermined minimum charger current value; and
   if the amplitude of the reduced charger current is below the predetermined minimum charger current value, increasing the charger current to the predetermined minimum charger current value.

5. An uninterruptible power supply comprising:
   an input module configured to receive input power;
   at least one battery;
   an output module configured to provide output power derived from at least one of the input power and battery power;
   an adjustable battery charger, coupled to the at least one battery, that generates a charger current; and
   a controller, coupled to the adjustable battery charger, that receives a signal representative of a system constraint and provides a reference, based on the signal, to the charger to control amplitude of the charger current based on the system constraint;
   wherein the system constraint includes a maximum input current to the uninterruptible power supply; and
   wherein the controller is configured to monitor input current to the uninterruptible power supply and to adjust the reference to decrease the charger current responsive to the input current exceeding the maximum input current.

6. The uninterruptible power supply as claimed in claim 5, further comprising a comparator, coupled to the controller, that receives the signal and the input current to the uninterruptible power supply, compares an amplitude of the input current with a maximum amplitude specified by the signal, and produces an error signal based on the comparison.

7. The uninterruptible power supply as claimed in claim 6, wherein the controller is configured to adjust the reference based on the error signal.

8. The uninterruptible power supply as claimed in claim 7, wherein the controller is further configured to decrease the reference by a predetermined increment responsive to the error signal indicating that the input current exceeds the maximum input current, to monitor the error signal, and to incrementally decrease the reference by the predetermined increment until the amplitude of the input current falls below the maximum input current.

9. The uninterruptible power supply as claimed in claim 5, further comprising a current limiter coupled to the controller, wherein the current limiter is configured to receive the reference and to adjust the reference to limit the charger current to within a predetermined range of amplitudes.

10. The uninterruptible power supply as claimed in claim 5, wherein the system constraint further includes a maximum charger current value.

11. The uninterruptible power supply as claimed in claim 10, wherein the controller is configured to compare an amplitude of the charger current to the maximum charger current value and to dynamically adjust the reference to maintain the charger current amplitude substantially at the maximum charger current value without allowing the input current to exceed the maximum input current.

* * * * *